U S009189182B2

(12) United States Patent
Jung et al.

(10) Patent No.: US 9,189,182 B2
(45) Date of Patent: Nov. 17, 2015

(54) METHOD AND APPARATUS FOR ACTIVATING DEVICE

(75) Inventors: Ji-woon Jung, Seoul (KR); Won-chang Jang, Seoul (KR); Hyo-sun Shim, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 599 days.

(21) Appl. No.: 12/758,260

(22) Filed: Apr. 12, 2010

(65) Prior Publication Data

US 2011/0107117 A1    May 5, 2011

(30) Foreign Application Priority Data

Nov. 4, 2009    (KR) ................. 10-2009-0105981

(51) Int. Cl.
*G06F 1/32*     (2006.01)
*H04B 7/00*     (2006.01)
*G06F 3/12*     (2006.01)
*H04W 4/00*     (2009.01)

(52) U.S. Cl.
CPC ............ *G06F 3/1221* (2013.01); *G06F 1/3287* (2013.01); *G06F 3/1229* (2013.01); *G06F 3/1236* (2013.01); *G06F 3/1292* (2013.01); *H04W 4/001* (2013.01); *G06F 3/1203* (2013.01); *G06F 3/1226* (2013.01); *Y02B 60/1271* (2013.01)

(58) Field of Classification Search
CPC ....... G06F 1/32; G06F 1/3203; G06F 1/3287; G06F 3/1221
USPC ...................... 713/320, 1, 300, 323; 455/41.2
See application file for complete search history.

(56) References Cited

U.S. PATENT DOCUMENTS

| 5,752,049 | A | * | 5/1998 | Lee ................................. 713/323 |
| 6,049,885 | A |   | 4/2000 | Gibson et al. |
| 6,304,899 | B1 | * | 10/2001 | Cromer et al. ................ 709/217 |
| 6,813,037 | B1 | * | 11/2004 | Collard ......................... 358/1.15 |
| 6,934,870 | B1 | * | 8/2005 | Amos ............................ 713/501 |
| 7,398,408 | B2 | * | 7/2008 | Paljug ........................... 713/323 |
| 8,156,360 | B2 | * | 4/2012 | Paljug ........................... 713/323 |
| 2002/0140963 | A1 | * | 10/2002 | Otsuka ......................... 358/1.14 |
| 2003/0056133 | A1 | * | 3/2003 | Talley .......................... 713/323 |
| 2004/0128310 | A1 | * | 7/2004 | Zmudzinski et al. ......... 707/102 |
| 2005/0122926 | A1 | * | 6/2005 | Cromer et al. ................ 370/311 |
| 2005/0272420 | A1 | * | 12/2005 | Matsuda et al. ........... 455/426.2 |
| 2006/0075269 | A1 | * | 4/2006 | Liong et al. .................. 713/300 |
| 2008/0003946 | A1 | * | 1/2008 | Lee et al. ..................... 455/41.2 |
| 2008/0244271 | A1 | * | 10/2008 | Yu ................................ 713/176 |

FOREIGN PATENT DOCUMENTS

KR          100727897 B1      6/2007

OTHER PUBLICATIONS

Communication, dated Feb. 28, 2014, issued by the Korean Intellectual Property Office in counterpart Korean Patent Application No. 10-2009-0105981.

* cited by examiner

*Primary Examiner* — Chun Cao
(74) *Attorney, Agent, or Firm* — Sughrue Mion, PLLC

(57) ABSTRACT

Method and apparatus for activating a slave device are provided. The method including: receiving communication medium scan signals comprising a slave device identifier; controlling a main power supply when the slave device is in an inactive state; determining whether the slave device is completely booted; and executing an upper layer communication when the slave device is completely booted.

32 Claims, 7 Drawing Sheets

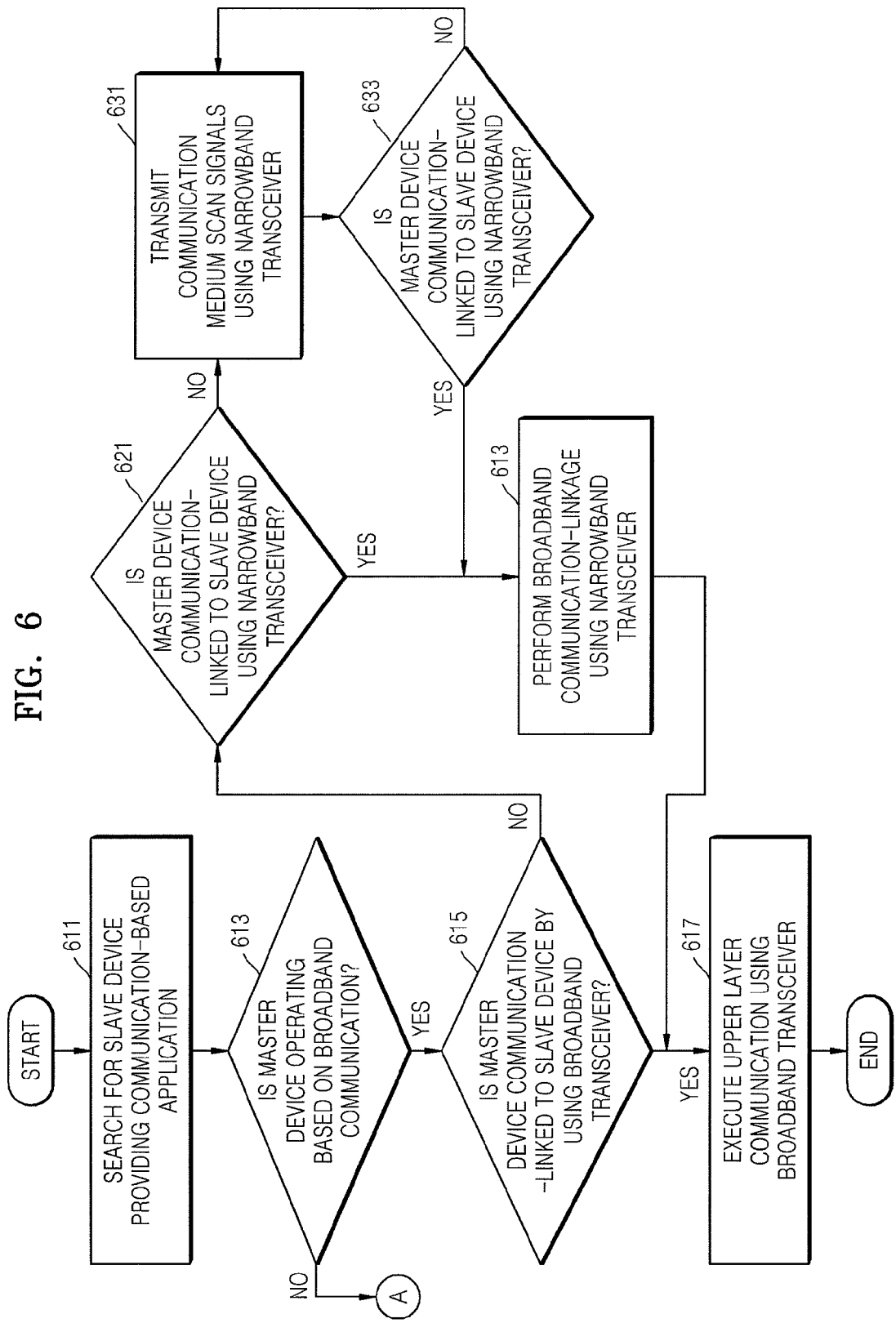

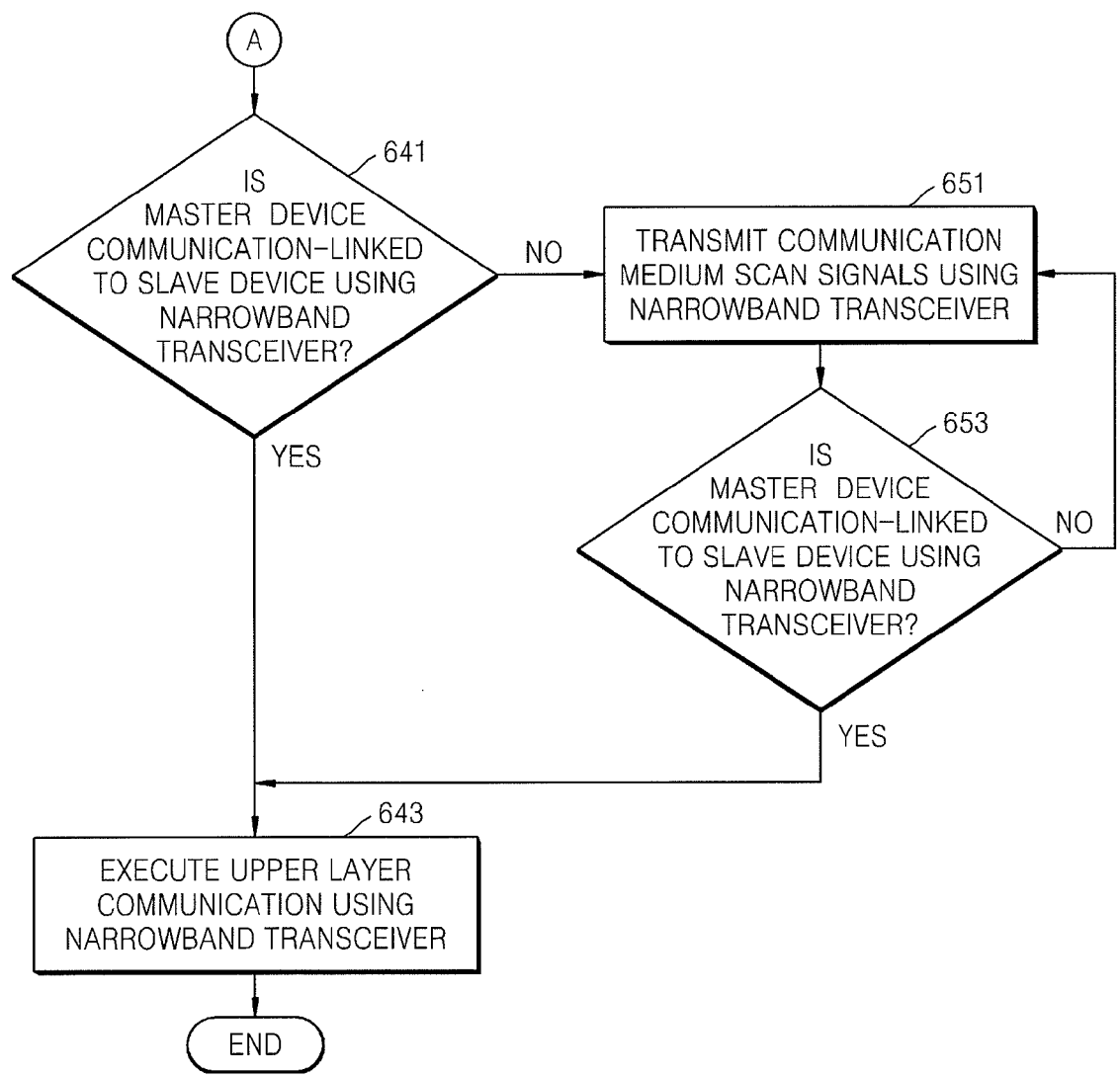

METHOD AND APPARATUS FOR ACTIVATING DEVICE

CROSS-REFERENCE TO RELATED PATENT APPLICATION

This application claims the benefit of Korean Patent Application No. 10-2009-0105981, filed on Nov. 4, 2009, in the Korean Intellectual Property Office, the disclosure of which is incorporated herein in its entirety by reference.

BACKGROUND

1. Field

Apparatuses and methods consistent with the exemplary embodiments relate to activating a device, and in particular, a method and apparatus for activating a device by controlling a power manager by identifying whether a lower layer of a communications protocol is linked.

2. Description of the Related Art

As networks are enhanced and all-internet protocol (all-IP) environments are provided, users utilize desired functions in a convergence environment among various apparatuses including a multimedia terminal (e.g. MP3 players), a personal computer (PC), electronic home appliances, and office apparatuses (e.g. printers).

In a convergence environment, if a user wants to utilize a function of a device (hereinafter referred to as a slave device) by using another device (hereinafter referred to as a master device) that is currently being used by the user, the user may directly turn on the slave device, communication-link the master device to the slave device, and then execute an application of the slave device.

For example, if a user listens to music being played by an MP3 player outside his or her home and upon returning home, wants to listen the music by using a home theater system, the user turns on the home theater system, links the MP3 player to be used by the home theater system to the home theater system, and then executes a music play application of the home theater system.

This process requires multiple user interventions, and the user needs to wait until procedures prior to the execution of the music play application are completely performed in the slave device.

SUMMARY OF THE EXEMPLARY EMBODIMENTS

The exemplary embodiments provide a method and apparatus for activating a device by controlling a power manager by identifying whether a lower layer of a communications protocol is linked.

The exemplary embodiments provide a computer readable recording medium on which a program for implementing the method is recorded.

According to an aspect of the exemplary embodiments, there is provided a method of activating a slave device, wherein the method includes: receiving communication medium scan signals including a slave device identifier; controlling a main power supply when the slave device is in an inactive state; determining whether the slave device is completely booted, and executing an upper layer communication when the slave device is completely booted.

According to an exemplary embodiment, the controlling of a main power supply may include transmitting a main power supply signal to a power manager for supplying a main power.

According to an exemplary embodiment, the determining of whether the slave device is completely booted may include: transmitting a device booting completion confirmation signal to a host controller interface (HCI), and selectively receiving a device booting completion response signal transmitted by the HCI as a response to the device booting completion confirmation signal.

According to an exemplary embodiment, the inactive state may include an inactive state of a transceiver and a soft power off state of the slave device.

According to an exemplary embodiment, the receiving of communication medium scan signals is periodically performed at a lower communication layer including a physical layer and a data link layer for a predetermined time period, and the communication medium scan signals are communication medium scan signals defined according to a narrowband communications standard.

According to an exemplary embodiment, the narrowband communications standard is at least one of a Bluetooth communications standard, a Zigbee communications standard, and a Wibree communications standard.

According to an exemplary embodiment, the method may further include activating a broadband transceiver by providing power to the broadband transceiver when the slave device is completely booted.

According to an exemplary embodiment, the slave device may include a narrowband transceiver and the broadband transceiver; the receiving of communication medium scan signals is performed in the narrowband transceiver; and the executing of the upper layer communication is performed using the broadband transceiver after the broadband transceiver is activated.

According to an exemplary embodiment, the broadband transceiver may be embodied according to a broadband communications standard such as a WiFi communications standard, a wireless high definition multimedia interface (HDMI) communications standard, or a wirelessHD (WiHD) communications standard.

According to another aspect of the exemplary embodiments, there is provided a method of activating a slave device, performed by a master device, the method including: searching for a slave device that provides a communications-based application; when the master device is not communication-linked to the slave device, transmitting communication medium scan signals including a slave device identifier; and when the master device is communication-linked to the slave device, executing an upper layer communication.

According to an exemplary embodiment, in the searching for the slave device, the slave device identifier is acquired by using a previous linkage history or an inquiry procedure defined according to a predetermined communications standard.

According to an exemplary embodiment, the searching for the slave device is performed using a narrowband transceiver, the transmitting of communication medium scan signals is performed at a lower communication layer including a physical layer and a data link layer, and the communication medium scan signals are communication medium scan signals defined according to a narrowband communications standard.

According to an exemplary embodiment, the narrowband communications standard is a Bluetooth communications standard, a Zigbee communications standard, or a Wibree communications standard, and the narrowband transceiver is embodied according to the narrowband communications standard.

According to an exemplary embodiment, the master device may include a narrowband transceiver and a broadband transceiver; the searching for the slave device is performed using the broadband transceiver; the transmitting of the communication medium scan signals is performed in the narrowband transceiver when the master device is not communication-linked to the slave device by using the broadband transceiver; and the executing of the upper layer communication is performed using the broadband transceiver when the master device is communication-linked to the slave device by using the narrowband transceiver According to an exemplary embodiment, the broadband transceiver is embodied according to a broadband communications standard, wherein the broadband communications standard is a WiFi communications standard, a wireless high definition multimedia interface (HDMI) communications standard, or a wirelessHD (WiHD) communications standard.

According to another aspect of the exemplary embodiments, there is provided a computer readable recording medium on which a program for performing the method is recorded.

According to another aspect of the exemplary embodiments, there is provided a slave device including: a base band unit for receiving communication medium scan signals including a slave device identifier; a power controller that controls a main power supply when the slave device is in an inactive state; a booting completion confirmer for confirming whether the slave device is completely booted; and a higher-layer communication unit that executes an upper layer communication when the slave device is completely booted.

According to another aspect of the exemplary embodiments, there is provided a master device including: a device search unit for searching for a slave device providing a communications-based application; a base band unit that transmits communication medium scan signals including a slave device identifier when the master device is not communication-linked to the slave device; and a higher-layer communication unit that executes upper layer communication when the master device is communication-linked to the slave device.

BRIEF DESCRIPTION OF THE DRAWINGS

The above and other aspects will become more apparent by describing in detail exemplary embodiments thereof with reference to the attached drawings in which:

FIGS. 6 and 7 are flowcharts illustrating an operation, performed by a master device, of activating a slave device, according to another exemplary embodiment.

DETAILED DESCRIPTION OF THE EXEMPLARY EMBODIMENTS

Figure 1:
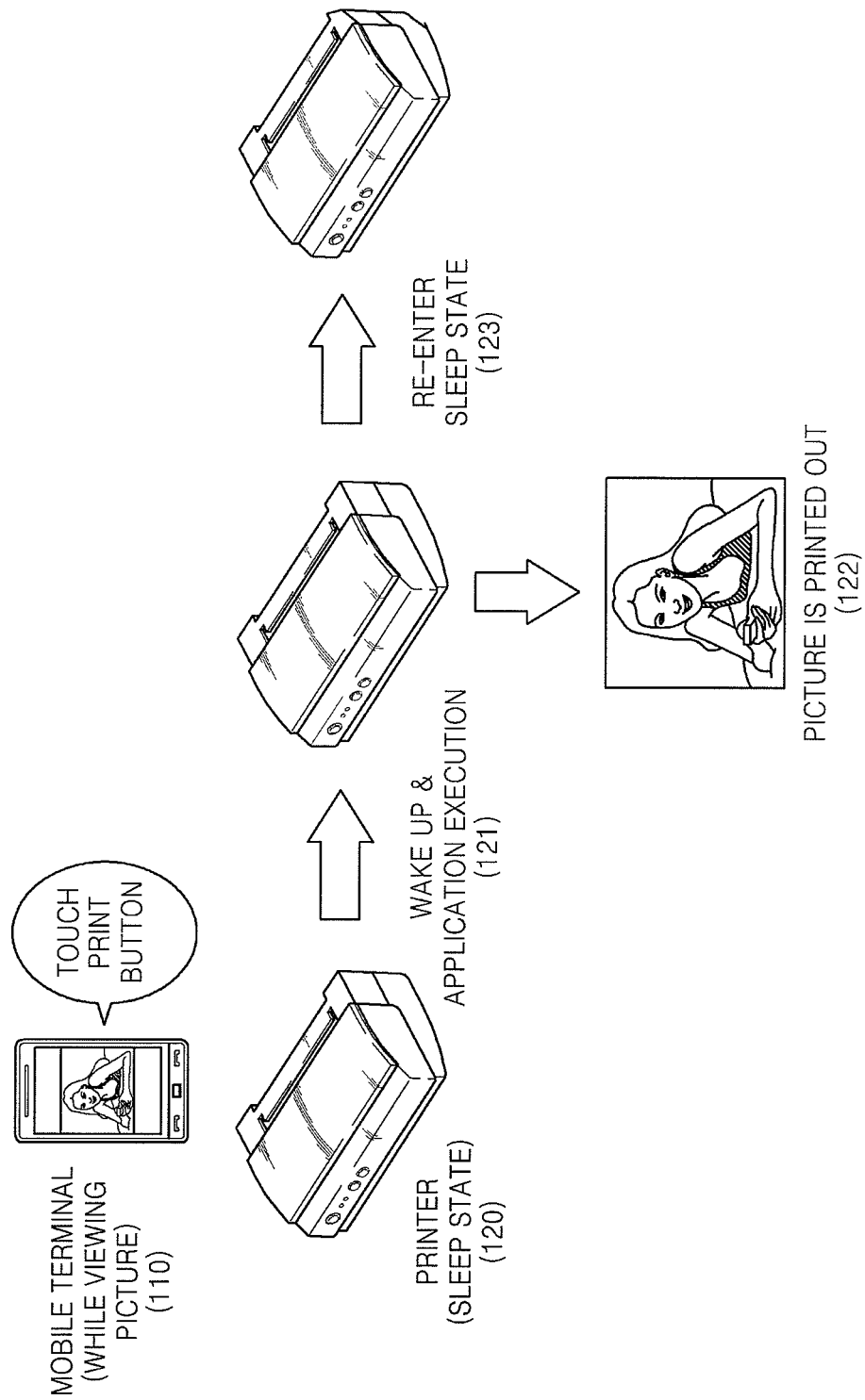
FIG. 1 is a schematic view illustrating a method, performed by a master device, of activating a slave device, according to an exemplary embodiment.

The aspects will now be described more fully with reference to the accompanying drawings, in which exemplary embodiments are shown. In the drawings, like reference numerals denote like elements, and the sizes of elements may be exaggerated for clarity.

FIG. 1 is a schematic view illustrating a method, performed by a master device, of activating a slave device, according to an exemplary embodiment.

A master device (e.g. a mobile terminal) is a device that is being currently used by a user, requests a communications link to a slave device, and acts as a master device when an initial communications network is constructed.

A slave device (e.g. printer) is a device to which the master device is communication-linked in order to use a function of the slave device.

Examples of a master device and a slave device according to exemplary embodiments may include all kinds of communications-based electronic devices including portable electronic devices such as camcorders, cameras, phones, or MP3 players, and electronic home appliances such as computers, electronic frames, printers, or home theater systems, but are not limited thereto.

According to an exemplary embodiment, when a user executes a communications-based application without any information about whether a slave device is in a communications inactive state or in a soft power off state, a lower communications layer of the master device is automatically linked to the slave device, thereby allowing the user to use a function of the slave device.

As illustrated in FIG. 1, when a user wants to print out pictures by using a printer that is in a sleep state (operation 120), while viewing pictures (operation 110) on a mobile terminal, once the user pushes a print button of a printing application, the printer is activated and then an application is executed (operation 121) and the pictures are printed out (operation 122). In this case, the user does not need to know whether the printer is in a communications inactive state or a soft power off state. After the pictures are printed out, the printer returns to the sleep state (operation 123).

Figure 2:
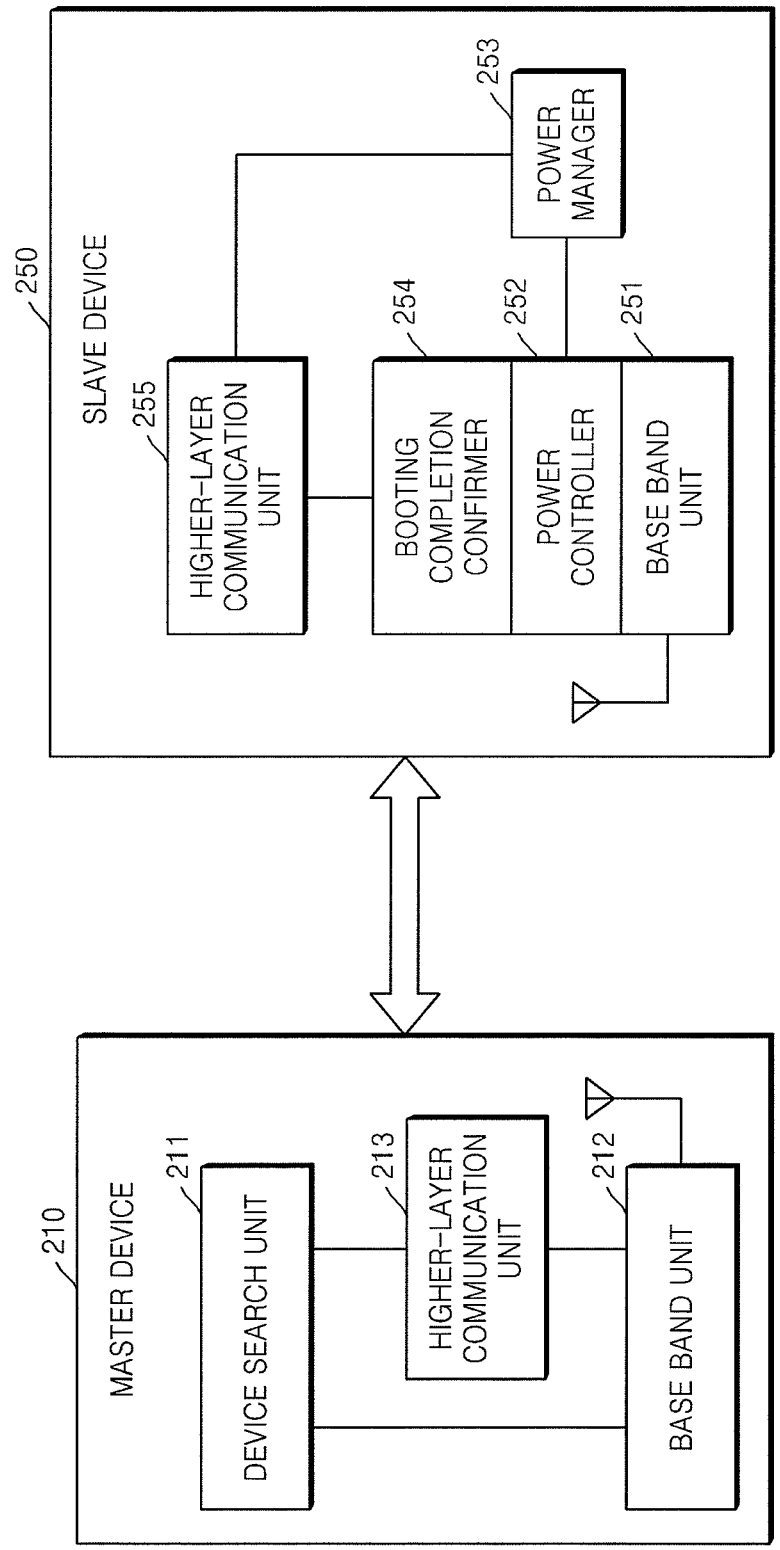
FIG. 2 is a block diagram illustrating structures of a master device and a slave device, according to an exemplary embodiment.

FIG. 2 is a block diagram illustrating structures of a master device 210 and a slave device 250, according to an exemplary embodiment.

The master device 210 includes a device search unit 211, a base band unit 212, and a higher-layer communication unit 213. The device search unit 211 and the higher-layer communication unit 213 may operate in a central processing unit (CPU) of the master device 210. The base band unit 212 may operate in a transceiver of the master device 210. The transceiver may be embodied according to a narrowband communications standard such as a Bluetooth communications standard, a Zigbee communications standard, or a Wibree communications standard, but is not limited thereto.

The device search unit 211 searches for the slave device 250 providing a communications-based application. When the slave device 250 is found and the master device 210 is peer to peer communication-linked to a physical layer of the slave device 250, an application of the slave device 250 may be used.

If the master device 210 is not communication-linked to the slave device 250, the base band unit 212 transmits communication medium scan signals including a slave device identifier. The base band unit 212 transmits communication medium scan signals at a lower communication layer including a physical layer and a data link layer for a predetermined time period. The communication medium scan signals refer to communication medium scan signals defined according to a narrowband communications standard. Since communication medium scan signals are transmitted according to a narrowband communications standard, a detailed description of the transmission procedure will not be presented herein.

If the higher-layer communication unit 213 is communication-linked to the slave device 250, upper layer communication operations are initiated.

The slave device 250 includes a base band unit 251, a power controller 252, a power manager 253, a booting completion confirmer 254, and a higher-layer communication unit 255.

The higher-layer communication unit 255 may operate in a CPU of the master device 210. The base band unit 251, the power controller 252, and the booting completion confirmer 254 may operate in a transceiver of the slave device 250.

The transceiver may be embodied according to a narrowband communications standard such as a Bluetooth communications standard, a Zigbee communications standard, or a Wibree communications standard. The transceiver may include a host controller interface (HCI) for interfacing with the CPU. The HCI refers to a proprietary digital interface, and may be a serial peripheral interface (SPI), a universal asynchronous receiver/transmitter (UART), or a universal serial bus (USB). When the slave device 250 is embodied as a single chip solution, the HCI may not be used.

When the slave device 250 enters a sleep mode, the slave device 250 may be in an inactive state while a CPU of the slave device 250 enters a soft power off state. In addition, in some cases defined by narrowband communications standards, the transceiver of the slave device 250 may enter the inactive state. Since the inactive state of the transceiver is defined according to a communications standard, the inactive state of the transceiver will not be described in detail herein.

The base band unit 251 receives communication medium scan signals including a slave device identifier. The base band unit 251 periodically tries to receive communication medium scan signals at a lower communication layer including a physical layer and a data link layer for a predetermined time period. Since communication medium scan signals are received according to a narrowband communications standard, a detailed description of the receiving procedure will not be presented herein.

When the base band unit 251 receives communication medium scan signals including a slave device identifier and the slave device 250 is in the inactive state, the power controller 252 controls a main power supply. The power controller 252 controls the main power supply by transmitting a main power supply signal to the power manager 253. Alternatively, the power controller 252 may directly control the main power supply without using the power manager 253.

When the power manager 253 receives the main power supply signal transmitted by the power controller 252, the power manager 253 supplies a main power to the slave device 250. That is, the power manager 253 wakes up the slave device 250 that has been in the inactive state and boots the slave device 250.

The booting completion confirmer 254 includes a booting completion confirmation signal transmitter and a booting completion confirmation signal respondent. The booting completion confirmation signal transmitter transmits a device booting completion confirmation signal to the HCI. When the slave device 250 is supplied with a main power and is completely booted, the booting completion confirmation signal respondent may receive a device booting completion response signal transmitted by the HCI as a response to the device booting completion confirmation signal.

Whether the booting is completely performed may be determined by interfacing with the CPU of the slave device 250 through the HCI. Meanwhile, when the slave device 250 is embodied as a single chip solution, the booting completion confirmer 254 may confirm the booting completion without using the HCI.

The higher-layer communication unit 255 executes upper layer communication when the slave device 250 is completely booted.

According to exemplary embodiments, when the master device 210 is used, user intervention for using an application of the slave device 250, such as turning on the slave device 250, communication-linking to the master device 210, or performing an application of the slave device 250, is minimized. Thus, user convenience may be improved.

In addition, according to exemplary embodiments, even when a particular packet format, such as a magic packet, is not defined, the slave device 250 is activated by only linking to a lower communication layer including a physical layer and a data link layer. Thus, a related art communications standard does not need to be changed and compatibility is provided.

Figure 3:
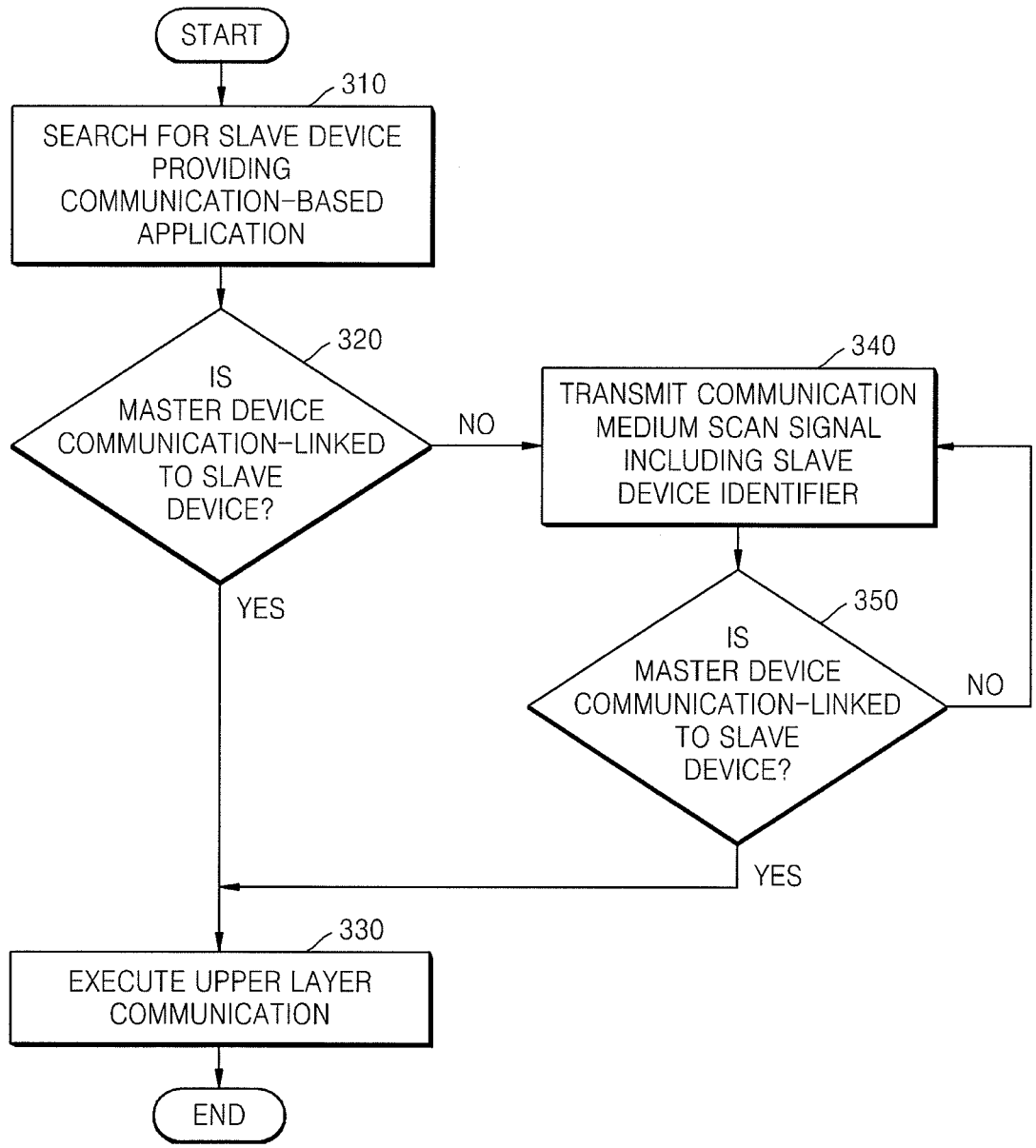
FIG. 3 is a flowchart illustrating an operation, performed by a master device, of activating a slave device, according to an exemplary embodiment.

FIG. 3 is a flowchart illustrating an operation, performed by the master device 210, of activating the slave device 250, according to an exemplary embodiment.

In operation 310, the master device 210 searches for the slave device 250 providing a communications-based application. The master device 210 may acquire an identifier of the slave device 250 by using a previous linkage history or an inquiry procedure defined according to a predetermined communications standard. If the master device 210 searches for a plurality of slave devices 250, priority is given to the most frequently used slave device or a slave device that is currently being powered.

In operation 320, it is determined whether the master device 210 is communication-linked to the slave device 250. If the master device 210 is communication-linked to the slave device 250, the master device 210 executes an upper layer communication including an application in operation 330.

If the master device 210 is not communication-linked to the slave device 250, the master device 210 transmits communication medium scan signals including a slave device identifier in operation 340. The transmitting of communication medium scan signals may be performed at a lower communication layer including a physical layer and a data link layer. The communication medium scan signals refer to communication medium scan signals defined according to a narrowband communications standard.

According to an exemplary embodiment, when the master device 210 is communication-linked to the slave device 250 according to a Bluetooth communications standard, the slave device 250 enters a page scan mode and receives communication medium scan signals. The master device 210 transmits communication medium scan signals by using a "Page" message. In order to stabilize a communications medium scan, after receiving a "First slave page response" message transmitted by the slave device 250, the master device 210 may transmit a "Master page response" message. In addition, after receiving a "Second slave page response" message transmitted by the slave device 250, the master device 210 may transmit a "First packet master" message.

In operation 350, it is re-determined whether the master device 210 is communication-linked to the slave device 250. If the master device 210 is communication-linked to the slave device 250, the master device 210 executes an upper layer communication including an application in operation 330.

If the master device 210 is not communication-linked to the slave device 250, the master device 210 re-transmits communication medium scan signals for a predetermined time period defined according to a communications standard.

Figure 4:
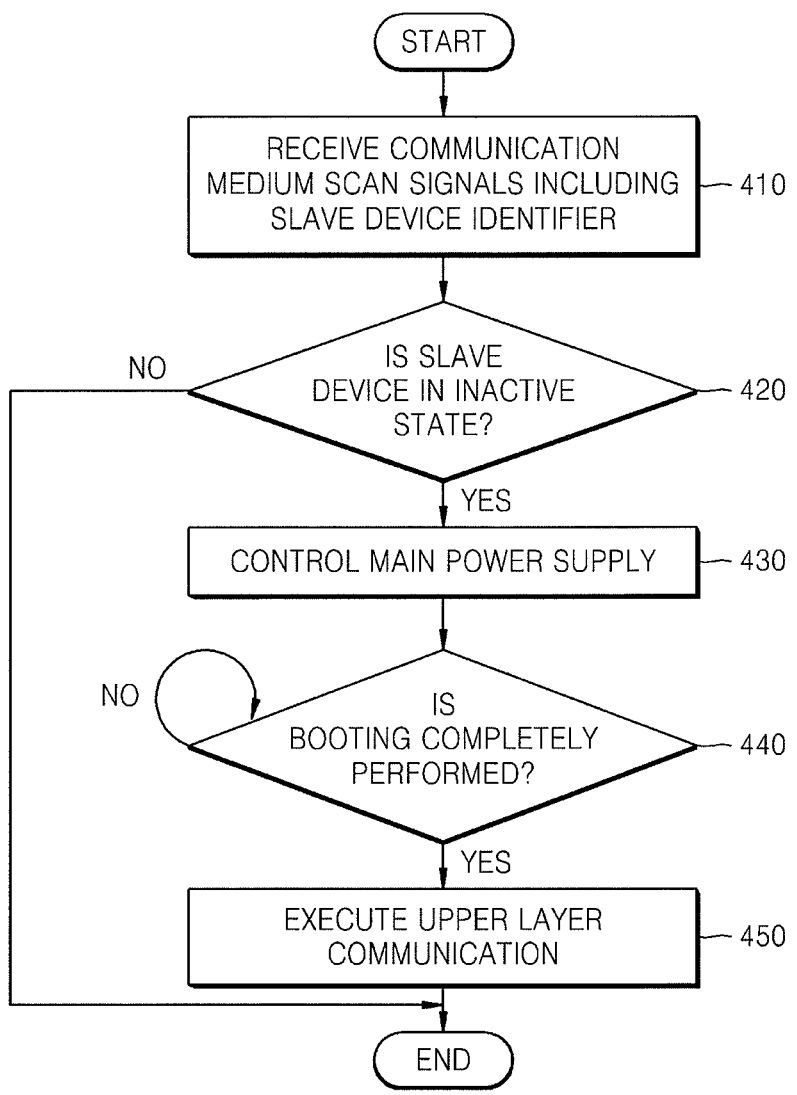
FIG. 4 is a flowchart illustrating an operation of activating a slave device, according to an exemplary embodiment.

FIG. 4 is a flowchart illustrating an operation of activating the slave device 250, according to an exemplary embodiment.

When the slave device 250 enters a sleep mode, the slave device 250 may be in an inactive state while the CPU of the slave device 250 enters a soft power off state. In addition, in some cases defined by a narrowband communications standard, the transceiver of the slave device 250 may enter the inactive state. Since the inactive state of the transceiver is defined according to a communications standard, the inactive state of the transceiver will not be described in detail herein.

In operation 410, the slave device 250 receives communication medium scan signals including a slave device identifier. Even after the CPU of the slave device 250 enters the sleep state, a minimum portion of the lower communication layer including a physical layer and a data link layer continues to operate in order to receive communication medium scan signals. The slave device 250 periodically tries to receive communication medium scan signals at the lower communication layer including a physical layer and a data link layer for a predetermined time period. The communication medium scan signals refer to communication medium scan signals defined according to a narrowband communications standard. Examples of the narrowband communications standard include Bluetooth, Zigbee, and Wibree communications standards, but is not limited thereto.

According to an exemplary embodiment, when the master device 210 is communication-linked to the slave device 250 according to a Bluetooth communications standard, the slave device 250 enters a page scan mode and receives communication medium scan signals. In the page scan mode, the slave device 250 may receive communication medium scan signals transmitted by the master device 210 by using a "Page" message. In this regard, in order not to receive communication medium scan signals transmitted by a device that is not authenticated, the slave device 250 activates a page scanner and inactivates an inquiry scanner. In order to stabilize a communications medium scan, after receiving a "Page" message transmitted by the master device 210, the slave device 250 may transmit a "First slave page response" message. In addition, after receiving a "Master page response" message transmitted by the master device 210, the slave device 250 may transmit a "Second slave page response" message. Finally, the slave device 250 receives communication medium scan signals transmitted by the master device 210 by using a "First packet master" message.

Since communication medium scan signals are received according to a narrowband communications standard, a detailed description of the receiving procedure will not be presented herein.

In operation 420, it is determined whether the slave device 250 is in an inactive state.

If the slave device 250 is in an inactive state, the slave device 250 controls a main power supply in operation 430. The slave device 250 may control a main power supply by transmitting a main power supply signal to the power manager 253 for providing a main power. Alternatively, the slave device 250 may directly control a main power supply without using the power manager 253.

In operation 440, the slave device 250 confirms whether the booting is completely performed.

In order to confirm whether the booting is completely performed, the slave device 250 transmits a device booting completion confirmation signal to the HCI. If the slave device 250 is provided with a main power and completely booted, the slave device 250 may receive a device booting completion response signal transmitted by the HCI as a response to the device booting completion confirmation signal.

The slave device 250 may confirm whether the booting is completely performed by interfacing with the CPU through the HCI. Meanwhile, if when the slave device 250 is embodied as a single chip solution, a booting completion confirmer 254 may directly confirm whether the slave device 250 is completely booted without using the HCI.

When the booting is completely performed, the slave device 250 may execute an upper layer communication in operation 460.

When the booting is incompletely performed, the slave device 250 may re-confirm whether the booing is completely performed in operation 440.

Figure 5:
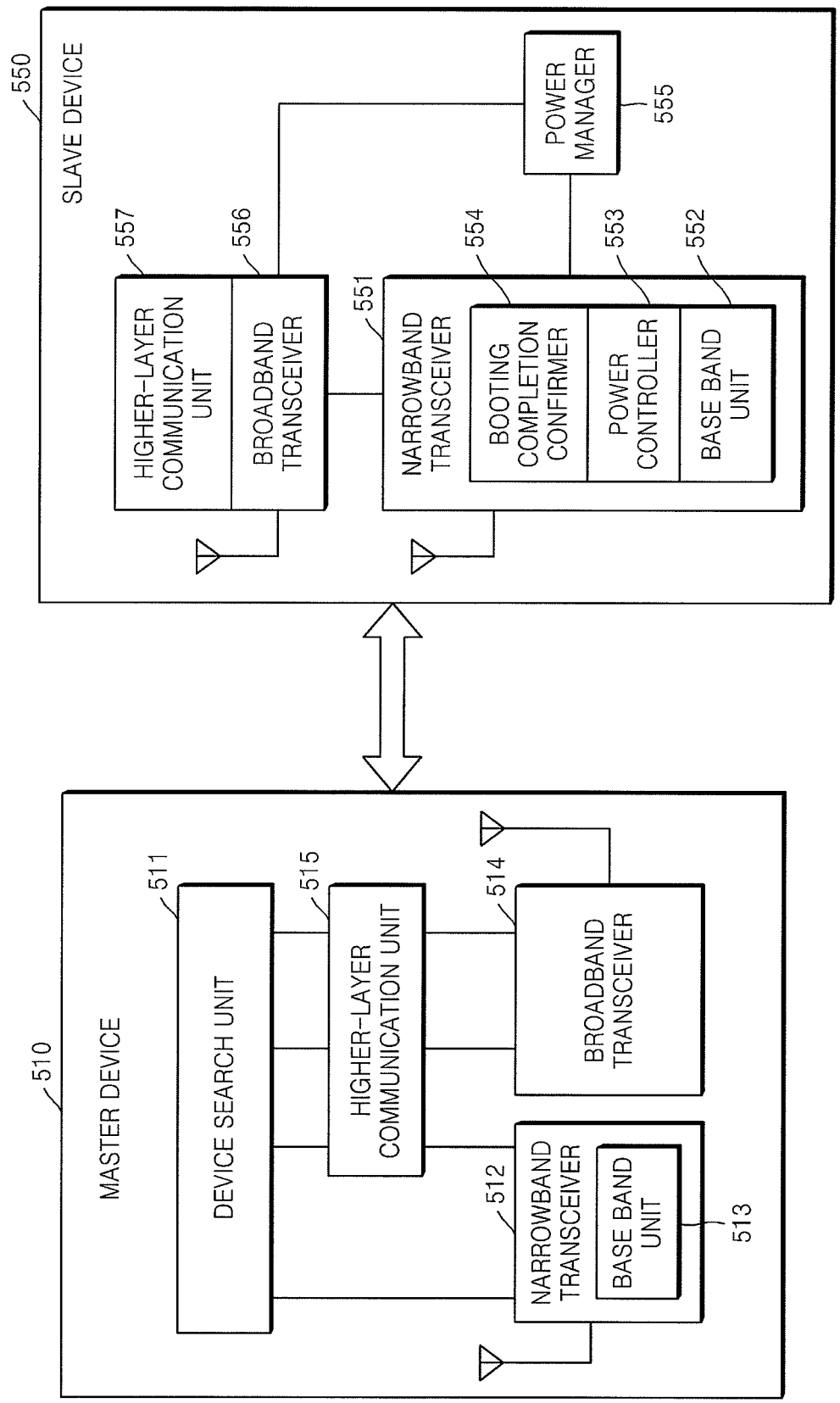
FIG. 5 is a block diagram illustrating structures of a master device and a slave device, according to another exemplary embodiment.

FIG. 5 is a block diagram illustrating structures of a master device 510 and a slave device 550, according to another exemplary embodiment.

The master device 510 includes a device search unit 511, a base band unit 513, a narrowband transceiver 512, a broadband transceiver 514, and a higher-layer communication unit 515. The device search unit 511 and the higher-layer communication unit 515 may operate in a CPU of the master device 510. The base band unit 513 may operate in the narrowband transceiver 512 of the master device 510, but is not limited thereto.

The narrowband transceiver 512 may be embodied according to a narrowband communications standard such as a Bluetooth communications standard, a Zigbee communications standard, or a Wibree communications standard. The broadband transceiver 514 may be embodied according to a broadband communications standard such as a WiFi communications standard, a wireless high definition multimedia interface (HDMI) communications standard, or a wireless HD (WiHD) communications standard.

The device search unit 511 searches for the slave device 550 that provides a broadband communications-based application. If the slave device 550 is found and the master device 510 is peer to peer communication-linked to a physical layer of the slave device 550, the broadband communications-based application of the slave device 550 may be used.

If the master device 510 is not communication-linked to the slave device 550 by using the broadband transceiver 514, the base band unit 513 transmits communication medium scan signals including a slave device identifier in the narrowband transceiver 512. The base band unit 212 transmits communication medium scan signals at a lower communication layer including a physical layer and a data link layer for a predetermined time period. The communication medium scan signals refer to communication medium scan signals defined according to a narrowband communications standard. Since communication medium scan signals are transmitted according to a communications standard, a detailed description of the transmission procedure will not be presented herein.

When the master device 510 is communication-linked to the slave device 550 by the narrowband transceiver 512, the higher-layer communication unit 515 executes upper layer communication by using the broadband transceiver 514.

When the communication-linkage to the upper communication layer is completed by using the broadband transceiver 514, the narrowband transceiver 512 of the master device 510 may disconnect the narrowband linkage.

The slave device 550 includes a narrowband transceiver 551, a base band unit 552, a power controller 553, a power manager 555, a booting completion confirmer 554, a broadband transceiver 556, and a higher-layer communication unit 557.

The higher-layer communication unit 557 may be executed in the CPU of the master device 510. The base band unit 552, the power controller 553, and the booting completion confirmer 554 may be performed in the narrowband transceiver 551 of the slave device 550.

The narrowband transceiver 551 may be embodied according to a narrowband communications standard such as a Bluetooth communications standard, a Zigbee communications standard, or a Wibree communications standard, but is not limited thereto. The narrowband transceiver 551 may include a HCI for interfacing with a CPU of the slave device 550. The HCI refers to a proprietary digital interface, and may be a serial peripheral interface (SPI), a universal asynchronous receiver/transmitter (UART), or a universal serial bus (USB). When the slave device 250 is embodied as a single chip solution, the HCI may not be used.

The broadband transceiver 556 may be embodied according to a broadband communications standard such as a WiFi communications standard, a wireless high definition multimedia interface (HDMI) communications standard, or a wirelessHD (WiHD) communications standard, but is not limited thereto.

When the slave device 550 enters a sleep mode, the slave device 250 may be in an inactive state while the CPU and broadband transceiver 556 of the slave device 550 enter a soft power off state.

The base band unit 552 receives communication medium scan signals including a slave device identifier in the narrowband transceiver 551. The base band unit 552 periodically tries to receive communication medium scan signals at a lower communication layer including a physical layer and a data link layer for a predetermined time period. Since communication medium scan signals are received according to a narrowband communications standard, a detailed description of the receiving procedure will not be presented herein.

According to an exemplary embodiment, when the master device 510 is communication-linked to the slave device 550 according to a Bluetooth communications standard, the slave device 550 enters a page scan mode and receives communication medium scan signals. Since communication medium scan signals are transmitted according to a narrowband communications standard, a detailed description of the transmission procedure will not be presented herein.

When communication medium scan signals including a slave device identifier are received and the slave device 550 is in an inactive state, the power controller 553 controls a main power supply. The power controller 553 controls the main power supply by transmitting a main power supply signal to the power manager 555. Alternatively, the power controller 553 may directly control the main power supply without using the power manager 555.

When the power manager 555 receives the main power supply signal transmitted by the power controller 553, the power manager 555 provides main power to the slave device 550. That is, the power manager 555 wakes up the slave device 550 that has been in the inactive state and boots the slave device 550.

The booting completion confirmer 554 may include a booting completion confirmation signal transmitter and a booting completion confirmation signal respondent. The booting completion confirmation signal transmitter transmits a device booting completion confirmation signal to a HCI. When the slave device 550 is provided with the main power and completely booted, the booting completion confirmation signal respondent receives a device booting completion response signal transmitted by the HCI as a response to the device booting completion confirmation signal.

The slave device 550 may confirm the device booting completion by interfacing with the CPU through the HCI. Meanwhile, when the slave device 550 is embodied as a single chip solution, the booting completion confirmer 554 may directly confirm the device booting completion without using the HCI.

When the slave device 550 is completely booted, the power manager 555 activates the broadband transceiver 556 by providing power to the broadband transceiver 556.

The higher-layer communication unit 557 executes an upper layer communication after the slave device 550 is completely booted and the broadband transceiver 556 is activated.

According to another exemplary embodiment, the master device 510 and the slave device 550 may be efficiently powered by including the broadband transceivers 514 and 556 and the narrowband transceivers 512 and 551, utilizing the broadband transceiver 556, which consumes a relatively large amount of power, as a transceiver for transmitting data, and utilizing the narrowband transceiver 551, which consumes a relatively small amount of power, as a transceiver for activating the slave device 550.

According to another exemplary embodiment, when the master device 510 is used, user intervention for using an application of the slave device 550, such as turning on the slave device 550, communication-linking to the master device 510, or performing an application of the slave device 550, is minimized. Thus, user convenience may be improved.

According to another exemplary embodiment, even when a particular packet format such as a magic packet is not defined, the slave device 550 is activated by only linking to a lower communication layer including a physical layer and a data link layer, and a broadband-based communications application is used. Thus, a related art communications standard does not need to be changed and compatibility is provided.

FIGS. 6 and 7 are flowcharts illustrating an operation, performed by the master device 510, of activating the slave device 550, according to another exemplary embodiment.

The master device 510 includes the narrowband transceiver 512 and the broadband transceiver 514.

In operation 611, the master device 510 searches for the slave device 550 providing a communications-based application by using the broadband transceiver 514. The master device 510 may acquire an identifier of the slave device 550 by using a previous linkage history or an inquiry procedure defined according to a predetermined communications standard. If the master device 510 searches for a plurality of slave devices 550, priority is given to the most frequently used slave device or a slave device that is currently being powered.

In operation 613, it is determined whether the master device 510 is operating on the basis of broadband communications.

If the master device 510 is not operating on the basis of broadband communications, it is determined whether the master device 510 is communication-linked to the slave device 550 by using the narrowband transceiver 512 in operation 641. If the master device 510 is communication-linked to the slave device 550, the master device 510 executes an upper layer communication including an application by using the narrowband transceiver 512 in operation 643.

If the master device 510 is not communication-linked to the slave device 550 by using the narrowband transceiver 512, the master device 510 transmits communication medium scan signals including a slave device identifier in operation 651. The transmission of communication medium scan signals may be performed at a lower communication layer including a physical layer and a data link layer. The communication medium scan signals refer to communication medium scan signals defined according to a narrowband communications standard.

In operation 653, it is re-determined whether the master device 510 is communication-linked to the slave device 550. If the master device 510 is communication-linked to the slave device 550, the master device 510 executes the upper layer communication including an application by using the narrowband transceiver 512 in operation 643.

If the master device 510 is not communication-linked to the slave device 550, the master device 510 re-transmits communication medium scan signals for a predetermined time period that is defined according to a narrowband communications standard.

If the master device 510 is operating on the basis of broadband communications, it is determined whether the master device 510 is communication-linked to the slave device 550 by using the broadband transceiver 514 in operation 615. If the master device 510 is communication-linked to the slave device 550, the master device 510 executes an upper layer communication including an application by using the broadband transceiver 514 in operation 617.

If the master device 510 is not communication-linked to the slave device 550 by using the broadband transceiver 514, it is determined whether the master device 510 is communication-linked to the slave device 550 by using the narrowband transceiver 514 in operation 621.

If the master device 510 is communication-linked to the slave device 550 by using the narrowband transceiver 514, the master device 510 performs a broadband communication-linkage by using the narrowband transceiver 512 in operation 613. Then, the master device 510 executes the upper layer communication including an application by using the broadband transceiver 514.

If the master device 510 is not communication-linked to the slave device 550 by using the narrowband transceiver 514, the master device 510 transmits communication medium scan signals including a slave device identifier in operation 631.

In operation 633, it is re-determined whether the master device 510 is communication-linked to the slave device 550. If the master device 510 is communication-linked to the slave device 550, the master device 510 performs a broadband transmission linkage by using the narrowband transceiver 512 in operation 613. Then, the master device 510 executes the upper layer communication including an application by using the broadband transceiver 514.

If the master device 510 is not communication-linked to the slave device 550, the master device 510 re-transmits communication medium scan signals for a predetermined time period that is defined according to a narrowband communications standard.

Meanwhile, each of the master devices 210 and 510 and the slave devices 250 and 550 may include a bus coupled to each unit illustrated in FIGS. 2 and 5, at least one processor (not shown) coupled to the bus, and a memory (not shown) that is coupled to the bus in order to store a command, a received message, or a generated message, and is coupled to at least one processor in order to implement the command.

Also, a system according to the exemplary embodiments may be embodied as a computer readable code on a computer readable recording medium. The computer readable recording medium may be any kind of recording device that stores data that is read by a computer system. Examples of the computer readable recording medium include magnetic storage media (e.g., ROM, floppy disks, hard disks, etc.) and optical recording media (e.g., CD-ROMs, or DVDs). Also, the computer readable recording medium may store and implement codes that are dispersed in a computer system linked by a network and are read by a computer in a dispersion manner.

The invention may also be embodied in other exemplary embodiments as computer readable codes on a computer readable transmission medium which may include carrier waves (such as data transmission through the Internet).

Further, expressions such as at least one of, when preceding a list of elements, modify the entire list of elements and do not modify the individual elements of the list.

While the aspects has been particularly shown and described with reference to exemplary embodiments thereof, it will be understood by those of ordinary skill in the art that various changes in form and details may be made therein without departing from the spirit and scope of the exemplary embodiments as defined by the following claims.

What is claimed is:

1. A method of waking up from an inactive state, the method comprising:
   receiving, via a narrowband linkage, scan signals comprising a slave device identifier at a lower layer communication comprising a physical layer and a data link layer for a predetermined time when a communication via a wideband linkage from a master device is determined to be unavailable;
   controlling a main power supply of the slave device when the slave device is in an inactive state;
   performing a waking-up from the inactive state;
   executing the communication via the wideband linkage after the waking-up,
   wherein the scan signals are communication medium scan signals defined according to a narrowband communication standard.

2. The method of claim 1, wherein the controlling of the main power supply comprises transmitting a main power supply signal to a power manager for supplying a main power.

3. The method of claim 1, wherein the performing the waking-up comprises:
   transmitting a device booting completion confirmation signal to a host controller interface (HCI); and
   selectively receiving a device booting completion response signal transmitted by the HCI as a response to the device booting completion confirmation signal.

4. The method of claim 1, wherein the inactive state comprises an inactive state of a transceiver and a soft power off state of the slave device.

5. The method of claim 1, wherein the narrowband communication standard is at least one of a Bluetooth standard, a Zigbee standard, and a Wibree standard.

6. The method of claim 1, wherein the broadband transceiver is embodied according to at least one of a broadband communication standard such as a WiFi standard, a wireless high definition multimedia interface (HDMI) standard, and a wirelessHD (WiHD) standard.

7. The method of claim 1, wherein the narrowband linkage is a communication linkage defined according to the narrowband communication standard.

8. The method of claim 1, further comprising disconnecting a narrowband linkage after the waking-up of the slave device.

9. The method of claim 1, the receiving scan signals comprising the slave device identifier further comprises acquiring the slave device identifier using at least one of a previous linkage history and an inquiry procedure defined according to a predetermined communication standard.

10. The method of claim 1, further comprising selecting the slave device based on priority given in accordance with frequency of the slave device being used.

11. The method of claim 1, further comprising selecting the slave device based on priority of whether the slave device is in active state.

12. A slave device comprising:
a base band unit which receives, via a narrowband linkage, scan signals comprising a slave device identifier when a communication via a wideband linkage from a master device is not available;
a power manager which performs a waking up from an inactive state when receiving a main power supply signal; and
a wideband communication unit which executes the communication via the wideband linkage after the waking up,
wherein the scan signals are defined according to a narrowband communication standard.

13. The slave device of claim 12, further comprising a power manager which provides a main power,
wherein a power controller transmits a main power supply signal to the power manager.

14. The slave device of claim 12, further comprising a booting completion confirmer which comprises:
a booting completion confirmation signal transmitter which transmits a device booting completion confirmation signal to a host controller interface (HCI); and
a booting completion confirmation signal respondent which selectively receives a device booting completion response signal transmitted by the HCI as a response to the device booting completion confirmation signal.

15. The slave device of claim 12, wherein the inactive state comprises an inactive state of a transceiver and a soft power off state of the slave device.

16. The slave device of claim 12, wherein the narrowband communication standard is at least one of a Bluetooth standard, a Zigbee standard, and a Wibree standard.

17. The slave device of claim 13, wherein when the slave device is completely woken-up, the power manager activates a broadband transceiver by providing power to the broadband transceiver.

18. The slave device of claim 17, wherein
the slave device comprises a narrowband transceiver and the broadband transceiver; the base band unit receives the scan signals in the narrowband transceiver;
the higher-layer communication unit executes the upper layer communication by using the broadband transceiver after the broadband transceiver is activated.

19. The slave device of claim 17, wherein the broadband transceiver is embodied according to at least one of a broadband communication standard, wherein the broadband communication standard is a WiFi standard, a wireless high definition multimedia interface (HDMI) standard, and a wirelessHD (WiHD) standard.

20. The slave device of claim 12, wherein the narrowband linkage is a communication linkage defined according to teh narrowband communication standard.

21. The slave device of claim 12, further comprising a power controller which transmits the power supply signal to the power manager.

22. A non-transitory computer readable recording medium having embodied thereon a computer program for performing a method of waking up from an inactive state, the method comprising:
receiving, via a narrowband linkage, scan signals comprising a slave device identifier at a lower layer communication comprising a physical layer and a data link layer for a predetermined time when a communication via a wideband linkage from a master device is not available;
controlling a main power supply of the slave device when the slave device is in the inactive state;
performing a waking-up from the inactive state; and
executing the upper layer communication via the wideband linkage after the waking-up,
wherein the scan signals are communication medium scan signals defined according to a narrowband communication standard.

23. A method of activating a slave device by a master device, the method comprising:
searching for a slave device providing a communication-based application;
transmitting, via a narrowband linkage, scan signals comprising a slave device identifier at a lower layer communication comprising a physical layer and a data link layer for a predetermined time, when the master device is determined to be un-able to execute a communication via a wideband linkage with the slave device; and
executing the communication via the wideband linkage when the master device is able to execute a communication via the narrowband linkage with the slave device and the slave device is woken-up from an inactive state;
wherein the scan signals are communication medium scan signals defined according to a narrowband communication standard.

24. The method of claim 23, wherein the narrowband linkage is a communication linkage defined according to a narrowband communication standard.

25. The method of claim 23, wherein the master device controls a main power supply of the slave device by transmitting a main power supply signal to a power manager of the slave device.

26. The method of claim 24, wherein the slave device identifier is acquired by using a previous linkage history or an inquiry procedure defined according to a predetermined communication standard.

27. A master device comprising:
a device search unit which searches for a slave device providing a communications-based application;
a base band unit which transmits, via a narrowband linkage, scan signals comprising a slave device identifier when the master device is determined to be unable to execute a communication via a wideband linkage with the slave device; and
a higher-layer communication unit which executes the communication via the wideband linkage after the master device is able to execute a communication via the narrowband linkage with the slave device and the slave device is woken-up from an inactive state,
wherein the scan signals are communication medium scan signals defined according to a narrowband communication standard.

28. The master device of claim 27, wherein the slave device identifier is acquired by using a previous linkage history or an inquiry procedure defined according to a predetermined communication standard.

29. The master device of claim 27, wherein the device search unit searches for the slave device using a narrowband transceiver,
the base band unit operates at the lower communication layer comprising a physical layer and a data link layer for a predetermined time period.

30. The master device of claim 29, wherein the narrowband communication standard is at least one of a Bluetooth standard, a Zigbee standard, and a Wibree standard; and
the narrowband transceiver is embodied according to the narrowband standard.

31. The master device of claim 27, wherein the master device comprises a narrowband transceiver and a broadband transceiver,
- the device search unit searches for the slave device by using the broadband transceiver,
- the base band unit transmits the scan signals in the narrowband transceiver when the master device is not communicatively linked to the slave device by using the broadband transceiver, and
- the higher-layer communication unit executes the upper layer communication by using the broadband transceiver when the master device is communicatively linked to the slave device by using the narrowband transceiver.

32. The master device of claim 31, wherein the broadband transceiver is embodied according to at least one of a broadband communication standard,
- wherein the broadband communication standard is a WiFi standard, a wireless high definition multimedia interface (HDMI) standard, or a wirelessHD (WiHD) standard.

* * * * *